(12) United States Patent
Pozgay et al.

(10) Patent No.: US 7,079,815 B2
(45) Date of Patent: Jul. 18, 2006

(54) MONOLITHIC MICROWAVE INTEGRATED CIRCUIT TRANSCEIVER

(75) Inventors: Jerome H. Pozgay, Marblehead, MA (US); Christopher P. McCarroll, Andover, MA (US)

(73) Assignee: Raytheon Company, Waltham, MA (US)

( * ) Notice: Subject to any disclaimer, the term of this patent is extended or adjusted under 35 U.S.C. 154(b) by 497 days.

(21) Appl. No.: 10/441,366

(22) Filed: May 20, 2003

(65) Prior Publication Data
US 2004/0235426 A1    Nov. 25, 2004

(51) Int. Cl.
*H04B 1/44* (2006.01)
(52) U.S. Cl. .................. 455/78; 455/83; 455/67.14; 455/80; 455/84; 455/191.3
(58) Field of Classification Search .................. 455/78, 455/67.14, 83, 84, 575.1, 80, 191.3; 370/401, 370/280; 375/258, 257
See application file for complete search history.

(56) References Cited
U.S. PATENT DOCUMENTS

| | | | | |
|---|---|---|---|---|
| 4,388,626 A | * | 6/1983 | Gans | 342/373 |
| 4,937,585 A | * | 6/1990 | Shoemaker | 343/700 MS |
| 5,471,220 A | * | 11/1995 | Hammers et al. | 342/372 |
| 5,566,171 A | * | 10/1996 | Levinson | 370/352 |
| 5,923,647 A | * | 7/1999 | Dolman et al. | 370/280 |
| 6,115,585 A | * | 9/2000 | Matero et al. | 455/78 |
| 6,236,839 B1 | * | 5/2001 | Gu et al. | 455/67.14 |
| 6,560,443 B1 | * | 5/2003 | Vaisanen et al. | 455/73 |
| 6,591,086 B1 | * | 7/2003 | Pleasant | 455/78 |
| 6,757,523 B1 | * | 6/2004 | Fry | 455/78 |

* cited by examiner

*Primary Examiner*—Marceau Milord
(74) *Attorney, Agent, or Firm*—Daly, Crowley, Mofford & Durkee, LLP.

(57) ABSTRACT

A transceiver having a transmit/receive switch. The transmit/receive switch includes: a common port adapted for coupling to an antenna element; a transmit port; a receive port and a matched port. The transceiver includes a second switch. The second switch has: a common port adapted for coupling to an input/output port through a gain/phase control unit; a transmit port; a receive port and a matched port. The transceiver includes a balanced amplifier. The balanced amplifier includes a pair of input ports. A first one of the pair of input ports is coupled to receive port of the transmit/receive switch, and a second one of the pair of input ports is coupled to the transmit port of the second switch. The balanced amplifier includes a pair of output ports. A first one of the pair of output ports is coupled to the transmit port of the transmit/receive switch and a second one of the pair of ports is coupled to the receive port of the second switch.

12 Claims, 2 Drawing Sheets

MONOLITHIC MICROWAVE INTEGRATED CIRCUIT TRANSCEIVER

TECHNICAL FIELD

This invention relates to generally to radio frequency transceivers, and more particularly to monolithic microwave integrated circuit (MMIC) transceivers.

BACKGROUND

As is known in the art, monolithic microwave integrated circuit transceivers have been used in many applications. One such application is in phased array antenna systems. In such system, an antenna beam is formed by providing a proper gain and phase to each one of the antenna elements in the array. In one application, a transceiver MMIC module is coupled to each one of the antenna elements to provide this proper gain and phase shift. Because the antenna is adapted to operate in both a transmit mode and a receive mode, attempts have been made to provide a module where there are common elements adapted for use in both the transmit and receive modes. One such transceiver is described in U.S. Pat. No. 4,635,062 "Transceiver Element for Phased Array Antenna" inventors Berig et al, issued Jan. 6, 1987 assigned to the same assignee as the present invention.

More particularly, the receive (R) circuitry includes low noise amplification (LNA) and phase/amplitude setting circuits. The transmit (T) circuitry includes phase/amplitude setting circuits and power amplification (PA). The circuitry that is in common between is the phase/amplitude setting circuits and in Transmit/Receive (T/R) systems (i.e., transceiver) where T and R have the same frequency, this circuitry can be shared. Therefore, Common-Leg (CL) circuits that include the phase/amplitude setting along with some amplification have been implemented in T/R modules to reduce part count, save space and save cost. This concept in the past has not included the LNA or PA because these functions have been better implemented for optimal performance using separate technologies. Fully integrated T/R CL circuits have been attempted in the past but at the cost of noise figure and/or transmit power of the system. The attempts usually had to trade off performance in receive or transmit due to losses in switching and signal routing that are required to change the antenna connection from T to R.

SUMMARY

In accordance with the present invention, a transceiver is provided. The transceiver includes a transmit/receive switch. The transmit/receive switch includes: a common port adapted for coupling to an antenna element; a transmit port; a receive port; and a matched load port. The transceiver includes a second transmit/receive switch. The second transmit/receive switch has: a common port adapted for coupling to an RF input/RF output port; a transmit port; a receive port; and a matched load port. The transceiver includes a balanced amplifier. The balanced amplifier includes a pair of input ports. A first one of the pair of input ports is coupled to the receive port of the transmit/receive switch, and a second one of the pair of input ports is coupled to the transmit port of the second switch. The balanced amplifier includes a pair of output ports. A first one of the pair of output ports is coupled to the transmit port of the transmit/receive switch and a second one of the pair of ports is coupled to the receive port of the second switch.

With such an arrangement, all transmit and receive circuitry including the LNA and PA are integrated into one common leg, here provided by the balanced amplifier, of an Microwave Monolithic Integrated Circuit (MMIC).

Therefore, the entire T/R circuit, right up at the antenna element, share the LNA and PA so that both space and device count are optimized. The LNA's provide pre-gain stages for the PA operation during transmit and the PA's provide post-gain stages for the LNA operation during receive. Both operations are accomplished using the same chain of amplifiers with the antenna port coupled to the antenna element being switched from the LNA to the PA.

In one embodiment, the transceiver includes an amplifier coupled between the transmit port of the second switch and the second one of the pair of inputs of the balanced amplifier.

In one embodiment, the transceiver includes an amplifier coupled between the receive port of the first transmit/receive switch and the first one of the pair of inputs of the balanced amplifier.

In one embodiment, each transmit/receive switch includes four sets of switchable transmission sections. Each one of the sections is coupled between a different pair of the ports of the transmit/receive switch. One of such pair of ports is the common port and the receive port, another one of the pair of ports being the common port and the transmit port, another one of the pair of ports being the transmit port and the fourth port; and a last one of the pair of ports being the fourth port and the receive port.

In one embodiment, each one of the switchable transmission sections includes a pair of serially connected $n\lambda/4$ transmission lines, where $\lambda$ is the nominal operating wavelength of the transceiver, and n is an odd integer. Each pair of transmission lines is connected together at a junction. Each transmission line section also includes a transistor having a pair of electrodes and a control electrode. The pair of electrodes is connected between the junction and ground and the control electrode is adapted for coupling to a control signal source. The transistor is configured to connect the junction to ground during one state of the control signal and to provide a substantially open circuit being the junction and ground in response to a second state of the control signal.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
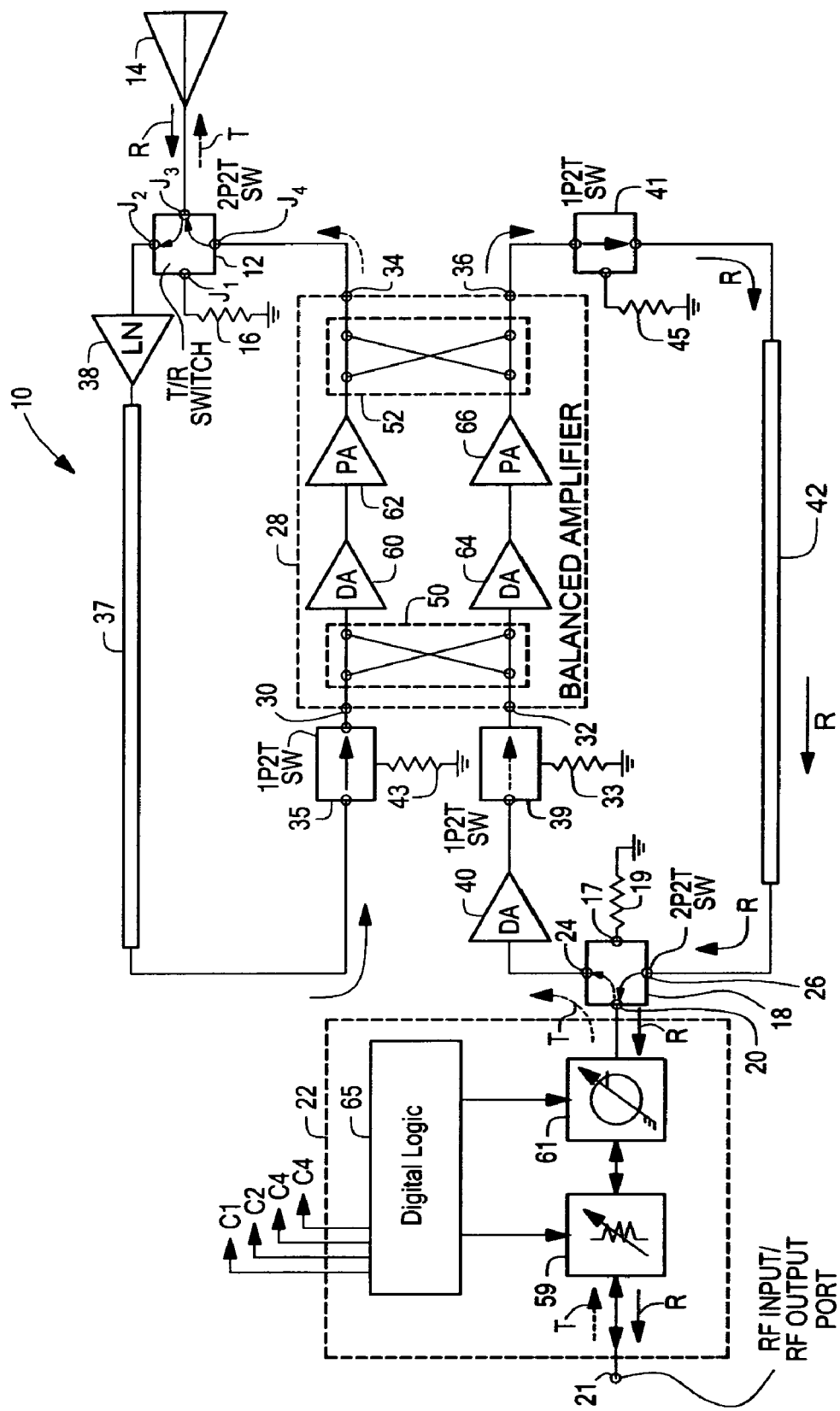
FIG. 1 is a schematic diagram of a transceiver according to the invention.

Referring now to FIG. 1, a transceiver 10 is shown to include a transmit/receive switch 12. The transmit/receive switch 12 is shown in more detail in FIG. 2. Suffice it to say here, however, that the T/R switch 12 includes: a common port. J3, adapted for coupling to an antenna element 14; a transmit port J4; a receive port J2, and a port J1 coupled to ground through a matching impedance 16, as shown.

The transceiver 10 includes a second T/R switch 18. The second switch 18 is identical in construction as T/R switch 12 and includes: a common port 20 adapted for coupling to an RF input/output port 21 through a gain/phase control unit 22; a transmit port 24; a receive port 26, and a port 17 coupled to ground through a matching impedance 19, as shown.

The transceiver 10 includes a balanced amplifier 28. The balanced amplifier 28 includes a pair of input ports 30, 32. Input port 30 is coupled to receive port J2 of the transmit/receive switch 12 through: a switch 35, a transmission line section 37 and a Low Noise Amplifier (LNA) 38, as shown. Input port 32 is coupled to the transmit port 24 of the second switch 18 through a switch 39 and a driver amplifier (DA) 40, as shown.

The balanced amplifier 28 includes a pair of output ports 34, 36. Output port 34 is coupled to the transmit port J4 of the transmit/receive switch 12 and output port 36 is coupled to the receive port 26 of the second switch 18 through a switch 41 and transmission line 42, as shown.

The balanced amplifier 28 includes an input 90-degree hybrid coupler 50 and an output 90-degree hybrid coupler 52. The 90-degree hybrid coupler 50 has a pair of inputs coupled to the input ports 30, 32, respectively, of the balanced amplifier 28. The 90-degree hybrid coupler 52 has a pair of outputs coupled to the output ports 34, 36, respectively, of the balanced amplifier 28.

The 90-degree hybrid coupler 50 has a pair of outputs, one output being coupled to cascaded amplifiers 60, 62 and the other output being coupled to cascaded amplifiers 64, 66, as shown. The 90-degree hybrid coupler 52 has a pair of inputs, one input being coupled to the output of the cascaded amplifiers 60, 62 and the other input being coupled to the output of cascaded amplifiers 64, 66, as shown.

During a transmit mode, the gain/phase control unit 22 provides control signal to the switches 12, 35, 41, 18 and 39. In response to such control signal, transmit radio frequency (RF) energy at port 21 transiting the gain/phase control unit 22, indicated by the dotted arrow T, passes from port 20 to port 24 of switch 18, then successively through amplifier 40, and switch 39 to the input port 32 of balanced amplifier 28. The transmit power is then split by the 90-degree hybrid junction 50 into two, half-power, paths; the power in one of the paths passing for amplification through amplifiers 60 and 62 and the power in the other one of the paths passing for amplification through amplifiers 64 and 66. The amplified power in these two paths combine, in phase, at port 34 of the balanced amplifier 28. The combined power passes to port J4 and through the T/R switch 12 to the antenna element 14 for transmission into free-space.

During a receive mode, the gain/phase control unit 22 provides control signal to the switches 12, 35, 41, 18 and 39. In response to such control signal, receive energy from antenna element 14, indicated by the solid arrow R, passes from the antenna element 14 to port J3 of the T/R switch 12 to port J2 of such switch 12. The power at port J2 is amplified in amplifier 38 and then passes through switch 35 to input port 30 of the balanced amplifier 28. The receive power is then split by the 90-degree hybrid junction 50 into two, half-power, paths; the power in one of the paths passing for amplification through amplifiers 60 and 62 and the power in the other one of the paths passing for amplification through amplifiers 64 and 66. The amplified power in these two paths combine, in phase, at port 36 of the balanced amplifier 28. The combined power passes through switch 41 and transmission line 42 to port 26 of switch 18. The power then passes through switch 18 to port 20 of such switch 18 and hence through the gain/phase control unit 22 to the RF input/RF output port 21. It is noted that a matched impedance load 19 is used to terminate a fourth port of switch 18.

It is noted that during the receive mode, the output of amplifier 40 is coupled via a matched impedance load 33 to ground through switch 39 and the output port 34 of the balanced amplifier 28 is coupled via a matched impedance load 16 to ground through switch 12 responding to a transmit control signal from the gain/phase control unit 22. Also, during the transmit mode, the output of amplifier 38 and the output port 36 of balanced amplifier 28 are coupled to ground via matched impedance loads 43, 45 through switches 35 and 41, respectively, responding to a receive control signal from the gain/phase control unit 22.

The gain/phase control unit 22 includes an electronically controllable attenuator 59, an electronically controllable phase shifter 61, and a digital/logic section 65 for providing the control signals to the attenuator 59, phase shifter 61, and the switches 12, 35, 41, 18 and 39, as described above.

Figure 2:
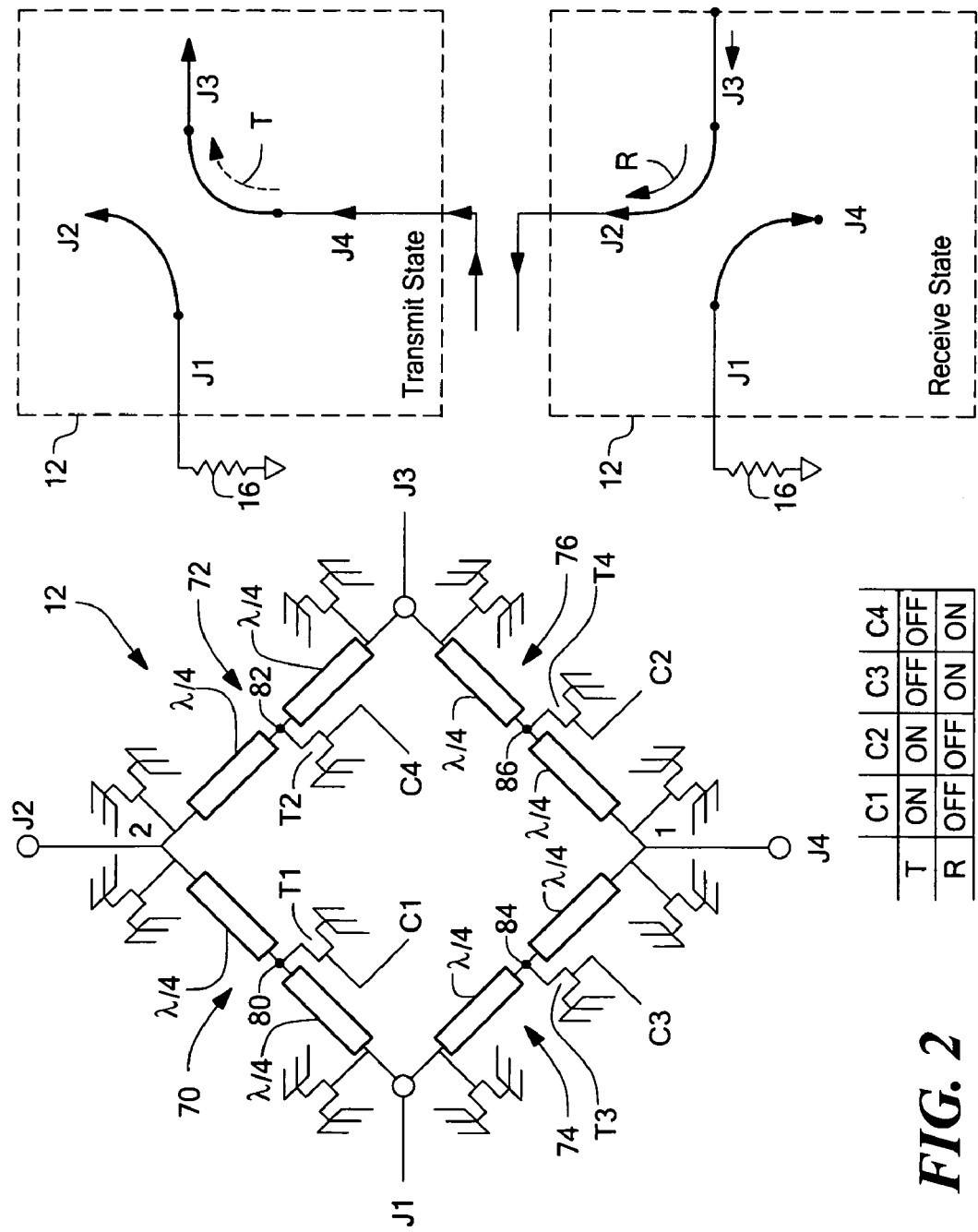
FIG. 2 is a schematic diagram of a transmit/receive (T/R) switch used in the transceiver of FIG. 1.

Referring now to FIG. 2, an exemplary one of the identical T/R switches 12, 18, here T/R switch 12 is shown in detail to include four sets of switchable transmission sections 70, 72, 74 and 76. Each one of the sections 70, 72, 74 and 76 is coupled between a different pair of the ports J1, J2, J3 and J4 of the transmit/receive switch 12. Thus, section 72 is connected between the common port J3 and the receive port J2. Section 76 is connected between the common port J3 and the transmit port J4. Section 74 is connected between the fourth port J1 and the transmit port J4. Section 70 is connected between the fourth port J1 and the receive port J2, as shown.

Each one of the switchable transmission sections 70, 72, 74 and 76 includes a pair of serially connected $n\lambda/4$ transmission lines, where $\lambda$ is the nominal operating wavelength of the transceiver, and n is an odd integer. Each pair of transmission lines is connected together at a junction, here junctions 80, 82, 84 and 86, as shown. Each transmission line section 70, 72, 74 and 76 also includes a transistor T1, T2, T3 and T4, respectively as shown. Each one of the transistors T1–T4 has a pair of electrodes, here such transistors T1–T4 are FETs having source and drain electrodes and a control electrode, here a gate electrode. The pair of electrodes (here the source and drain electrodes) is connected between the junctions 80, 82, 84 and 86 respectively, as shown, and ground. The control electrodes of the transistors T1–T4 are connected to control lines C1–C4, respectively. Control signals on lines C1–C4 are supplied by the gain/phase control unit 22 digital/logic 65. The transistor is configured to connect the junction to ground during one state of the control signal and to provide a substantially open circuit between the junction and ground in response to a second state of the control signal.

More particularly, during the transmit mode, control signals on lines C1–C4 turn transistors T1 and T2 on and turn transistors T3 and T4 off. During the receive mode, control signals on lines C1–C4 turn transistors T1 and T2 off and turn transistors T3 and T4 on.

The transceiver 10 allows peak performance in both transmit and receive chains to be achieved simultaneously. It is noted that the transceiver 10 uses a common leg technique having the same attenuator 60 and phase shifter 62 in both transmit and receive paths.

It is also noted that the balanced amplifier 28 may be fabricated with several PHEMT and MHEMT GaAs based semiconductor processes, which enables fabrication of the transceiver 10 as an MMIC.

A number of embodiments of the invention have been described. Nevertheless, it will be understood that various modifications may be made without departing from the spirit and scope of the invention. Accordingly, other embodiments are within the scope of the following claims.

What is claimed is:

1. A transceiver, comprising:
   (a) a first transmit/receive switch, such switch having:
      (i) a common port adapted for coupling to an antenna element;
      (ii) a transmit port;
      (iii) a receive port; and
      (iv) a matched load port;
   (b) a second transmit/receive switch, such second transmit/receive switch having a common port adapted for coupling to an input/output port; a transmit port; a receive port; and a matched load port; and
   (c) a balanced amplifier having:
      (i) a pair of input ports, a first one of the pair of input ports being coupled to receive port of the first transmit/receive switch, a second one of the pair of input ports being coupled to the transmit port of the second transmit/receive switch; and
      (ii) a pair of output ports, a first one of the pair of output ports being coupled to the transmit port of the first transmit/receive switch and a second one of the pair of ports being coupled to the receive port of the second transmit/receive switch.

2. The transceiver recited in claim 1 including an amplifier coupled between the transmit port of the second transmit/receive switch and the second one of the pair of inputs of the balanced amplifier.

3. The transceiver recited in claim 1 including an amplifier coupled between the receive port of the first transmit/receive switch and the first one of the pair of inputs of the balanced amplifier.

4. The transceiver recited in claim 1 wherein one of the first transmit/receive switch and second transmit/receive switch comprises:
   four sets of switchable transmission sections, each one of the sections being coupled between a different pair of the ports of such one of the first transmit/receive switch and second transmit/receive switch, one of such pair of ports being the common port of such one of the first transmit/receive switch and second transmit/receive switch and the receive port of such one of the first transmit/receive switch and second transmit/receive switch, another one of the pair of ports being the common port of such first transmit/receive switch and second transmit/receive switch and the transmit port of such one of the first transmit/receive switch and second transmit/receive switch, another one of the pair of ports being the transmit port of such one of the first transmit/receive switch and second transmit/receive switch and the matched load port of such one of the first transmit/receive switch and second transmit/receive switch; and a last one of the pair of ports being the matched load port of the first transmit/receive switch and the receive port of the first transmit/receive switch.

5. The transceiver recited in claim 4 wherein each one of the switchable transmission sections comprises:
   (a) a pair of serially connected $n\lambda/4$ transmission lines, where $\lambda$ is the nominal operating wavelength of the transceiver, and n is a odd integer, such pair of transmission lines being connected together at a junction; and
   (b) a transistor having a pair of electrodes and a control electrode, the pair of electrodes being connected between the junction and ground and the control electrode being adapted for coupling to a control signal source, such transistor being configured to connect the junction to ground during one state of the control signal and to provide a substantially open circuit being the junction and ground in response to a second state of the control signal.

6. The transceiver recited in claim 5 including a gain/phase control unit coupled between the common port of the second transmit/receive switch and the input/output port, and wherein such gain/phase control unit includes a phase shifter.

7. The transceiver recited in claim 1 including a gain/phase control unit coupled between the common port of the second transmit/receive switch and the input/output port, and wherein such gain/phase control unit includes an attenuator.

8. The tranceiver recited in claim 1 wherein the balanced amplifier comprises:
   a first amplifier section;
   a second amplifier section;
   a first coupler having:
      a pair of input ports, a first one of the pair of input ports of the first coupler being coupled to the receive port of the first transmit/receive switch and a second one of the pair of input ports of the first switch being coupled to the transmit port of the second one of the transmit receive switch;
      a pair of output ports, a first one of the pair of output ports of the first coupler being coupled to an input of the first amplifier and a second one of the pair of output ports of the first coupled being coupled to an input of the second amplifier section; a second coupler having:
      a pair of output ports, a first one of the pair of output ports of the second coupler being coupled to the transmit port of the first transmit/receive switch and a second one of the pair of output ports of the second switch being coupled to the receive port of the second one of the transmit receive switch;
      a pair of input ports, a first one of the pair of input ports of the second coupler being coupled to an output of the first amplifier and a second one of the pair of input ports of the second coupled being coupled to an output of the second amplifier section.

9. The transceiver recited in claim 8 including a pair of additional switches, a first one of the additional switches being coupled between the receive port of the first transmit/receive switch and the first one of the pair of input ports of the first switch and a second one of the additional switches being coupled between the transmit port of the second transmit/receive switch and the second one of the pair of input ports of the first switch.

10. The transceiver recited in claim 8 wherein the first coupler couples emerge at the first one of the pair of input ports thereof to both pair of output ports thereof.

11. The transceiver recited in claim 8 wherein the second coupler couples emerge at the first one of the pair of input ports thereof to both pair of output ports thereof.

12. The transceiver recited in claim 11 wherein the first coupler couples emerge at the first one of the pair of input ports thereof to both pair of output ports thereof.

* * * * *

UNITED STATES PATENT AND TRADEMARK OFFICE
CERTIFICATE OF CORRECTION

| | | |
|---|---|---|
| PATENT NO. | : 7,079,815 B2 | |
| APPLICATION NO. | : 10/441366 | |
| DATED | : July 18, 2006 | |
| INVENTOR(S) | : Jerome H. Pozgay et al. | |

It is certified that error appears in the above-identified patent and that said Letters Patent is hereby corrected as shown below:

Title Page #57
Abstract line 10, delete "to receive port" and replace with --to the receive port--.

Column 1, line 6, delete "relates to generally" and replace with --relates generally--.

Column 1, line 15, delete "such system" and replace with --such a system--.

Column 2, line 7, delete "LNA's" and replace with --LNAs--.

Column 2, line 8, delete "PA's" and replace with --PAs--.

Column 2, lines 62-63, delete "common port. J3," and replace with --common port J3,--.

Column 3, line 34, delete "provides control signal" and replace with --provides a control signal--.

Column 3, line 35, delete "to such control signal" and replace with --to such a control signal--.

Column 3, line 51, delete "provides control signal" and replace with --provides a control signal--.

Column 3, line 52, delete "to such control signal" and replace with --to such a control signal--.

Columns, line 18, delete "to receive port" and replace with --to the receive port--.

Column 6, line 29, delete "transmit receive" and replace with --transmit/receive--.

Column 6, line 33, delete "first coupled" and replace with --first coupler--.

Column 6, line 41, delete "transmit receive" and replace with --transmit/receive--.

UNITED STATES PATENT AND TRADEMARK OFFICE
CERTIFICATE OF CORRECTION

PATENT NO. : 7,079,815 B2
APPLICATION NO. : 10/441366
DATED : July 18, 2006
INVENTOR(S) : Jerome H. Pozgay et al.

It is certified that error appears in the above-identified patent and that said Letters Patent is hereby corrected as shown below:

Column 6, line 45, delete "second coupled" and replace with --second coupler--.

Signed and Sealed this

Third Day of April, 2007

JON W. DUDAS
*Director of the United States Patent and Trademark Office*